United States Patent
Wu et al.

(10) Patent No.: US 10,904,327 B2
(45) Date of Patent: Jan. 26, 2021

(54) METHOD, ELECTRONIC DEVICE AND COMPUTER PROGRAM PRODUCT FOR SEARCHING FOR NODE

(71) Applicant: EMC IP Holding Company LLC, Hopkinton, MA (US)

(72) Inventors: Pengfei Wu, Shanghai (CN); Zhi Ying, Shanghai (CN); Kun Wang, Beijing (CN); Ming Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/394,526

(22) Filed: Apr. 25, 2019

(65) Prior Publication Data
US 2019/0387054 A1   Dec. 19, 2019

(30) Foreign Application Priority Data
Jun. 15, 2018   (CN) .......................... 2018 1 0621143

(51) Int. Cl.
*H04L 29/08*   (2006.01)

(52) U.S. Cl.
CPC ...... *H04L 67/1065* (2013.01); *H04L 67/1097* (2013.01); *H04L 67/146* (2013.01); *H04L 67/147* (2013.01)

(58) Field of Classification Search
CPC ... H04L 41/12; H04L 67/1065; H04L 67/147; H04L 67/146; H04L 67/1097; H04L 67/10
USPC ........................................................ 709/223
See application file for complete search history.

(56) References Cited

U.S. PATENT DOCUMENTS

| | | | |
|---|---|---|---|
| 7,206,934 B2* | 4/2007 | Pabla ..................... | H04L 63/02 709/226 |
| 9,596,305 B2* | 3/2017 | Chauhan ............ | H04L 67/1097 |
| 2015/0207724 A1* | 7/2015 | Choudhury ............ | H04L 45/42 370/255 |
| 2016/0164723 A1* | 6/2016 | Cimprich ................ | H04L 47/27 709/221 |
| 2016/0283540 A1* | 9/2016 | Barber .................. | G06F 16/137 |

(Continued)

OTHER PUBLICATIONS

P. Maymounkov et al., "Kademlia: A Peer-to-Peer Information System Based on the XOR Metric," First International Workshop on Peer-to-Peer Systems (IPTPS), Mar. 7-8, 2002, pp. 53-65.

*Primary Examiner* — Kristie D Shingles
(74) *Attorney, Agent, or Firm* — Ryan, Mason & Lewis, LLP

(57) ABSTRACT

Embodiments of the present disclosure provide a computer-implemented method, an electronic device and a computer program product. In this method, an attribute description of a node is determined at the node of a computer network based on a distributed hash table The attribute description comprises a plurality of attribute items and respective attribute values. A key-identifier pair of the node in the distributed hash table is generated where the key being obtained from the attribute description based on a predetermined mapping so that the node is searchable by the distributed hash table according to the attribute description. The key-identifier pair is transmitted to at least one node connected directly with the node. Embodiments of the present disclosure can improve searching of a node in a computer network.

20 Claims, 5 Drawing Sheets

(56) References Cited

U.S. PATENT DOCUMENTS

2018/0276417 A1* 9/2018 Cerezo Sanchez ..... G06F 21/74
2019/0087445 A1* 3/2019 Zhu ..................... G06F 16/2246

* cited by examiner

METHOD, ELECTRONIC DEVICE AND COMPUTER PROGRAM PRODUCT FOR SEARCHING FOR NODE

RELATED APPLICATION(S)

The present application claims priority to Chinese Patent Application No. 201810621143.2, filed Jun. 15, 2018, and entitled "Method, Electronic Device and Computer Program Product for Searching for Node," which is incorporated by reference herein in its entirety.

FIELD

Embodiments of the present disclosure generally relate to a computer system or a cloud system, and more specifically, to a method, an electronic device and a computer program product for searching for a node.

BACKGROUND

A computer network generally refers to a computer system connecting multiple computers with independent functions and locating at different geological locations and external devices thereof, which are connected with communication lines to achieve resource sharing and information transfer under the management and coordination of network operating systems, network management software and network communication protocols.

In a decentralized computer network, there is no master node or management node for managing the other nodes. Without any knowledge on the topological structure of the computer network, to find a node with specific properties, a node performing a search needs to broadcast a search message to the entire network so that other nodes can learn that the searching node is looking for a node with the specific properties. However, this traditional broadcasting searching approach cannot meet the performance requirement of the computer network in many scenarios.

SUMMARY

Embodiments of the present disclosure provide a computer-implemented method, an electronic device and a computer program product.

In a first aspect of the present disclosure, there is provided a computer-implemented method. The method comprises: determining, at a node of a computer network based on a distributed hash table, an attribute description of the node, the attribute description comprising a plurality of attribute items and respective attribute values. The method further comprises: generating a key-identifier pair of the node in the distributed hash table, the key being obtained from the attribute description based on a predetermined mapping so that the node is searchable by the distributed hash table according to the attribute description. The method further comprises transmitting the key-identifier pair to at least one node connected directly with the node.

In a second aspect of the present disclosure, there is provided an electronic device, comprising at least one processor and at least one memory including computer program instructions. The at least one memory and the computer program instructions are configured to, together with the at least one processor, cause the electronic device to: determine, at a node of a computer network based on a distributed hash table, an attribute description of the node, the attribute description comprising a plurality of attribute items and respective attribute values. The at least one memory and the computer program instructions are further configured to, together with the at least one processor, cause the electronic device to: generate a key-identifier pair of the node in the distributed hash table, the key being obtained from the attribute description based on a predetermined mapping so that the node is searchable by the distributed hash table according to the attribute description. The at least one memory and the computer program instructions are further configured to, together with the at least one processor, cause the electronic device to: transmit the key-identifier pair to at least one node connected directly with the node.

In a third aspect of the present disclosure, there is provided a computer program product tangibly stored on a non-transitory computer readable medium and including machine executable instructions which, when executed, cause the machine to perform steps of the method according to the first aspect.

It is to be understood that the content described in the Summary is not intended to identify key features or essential features of the claimed subject matter, nor is it intended to be used to limit the scope of the claimed subject matter. Other features of the present disclosure will be more comprehensible with the following depiction.

BRIEF DESCRIPTION OF THE DRAWINGS

Through the following detailed description with reference to the accompanying drawings, the above and other objectives, features, and advantages of example embodiments of the present disclosure will become more apparent. Several example embodiments of the present disclosure will be illustrated by way of example with no limitation in the drawings in which.

Throughout the drawings, the same or similar reference symbols refer to the same or similar elements.

DETAILED DESCRIPTION

Figure 1:
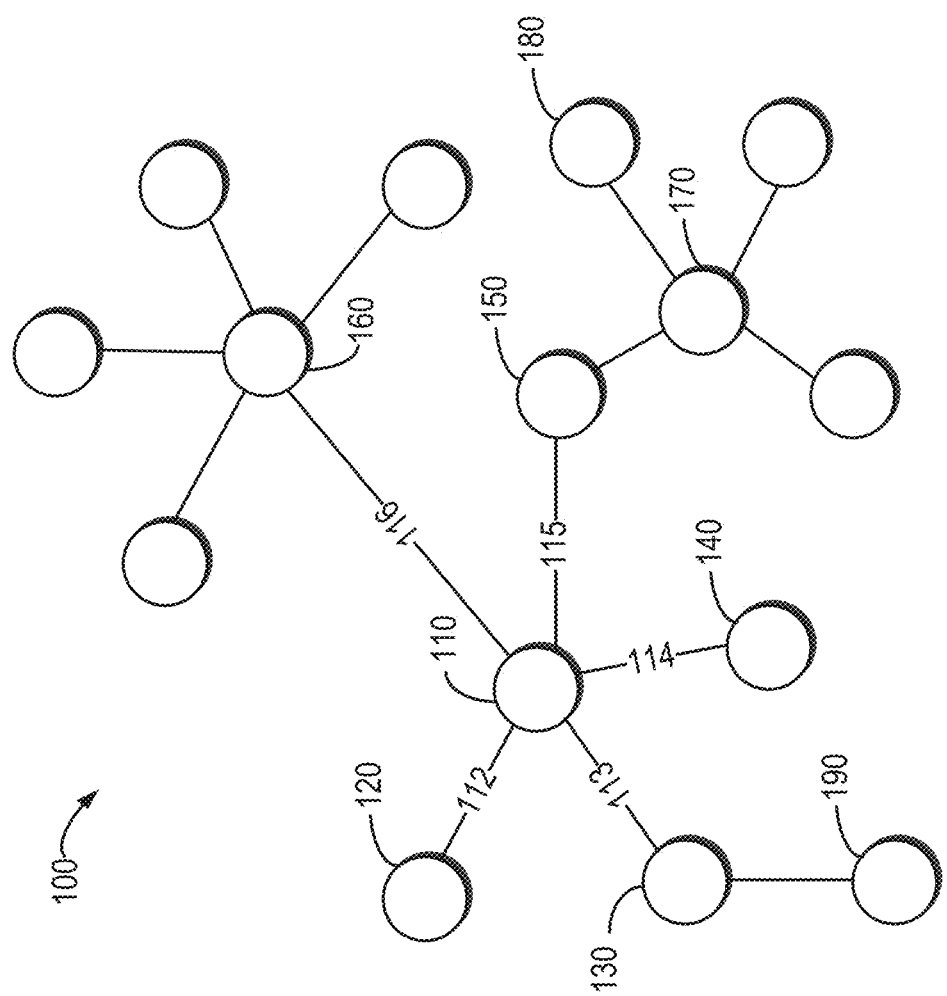
FIG. 1 is a schematic diagram illustrating a computer network in which embodiments of the present disclosure may be implemented.

Principles and spirits of the present disclosure will now be described with reference to various example embodiments illustrated in the drawings. It is to be understood that description of those embodiments is merely to enable those skilled in the art to better understand and further implement the present disclosure and not intended for limiting the scope disclosed herein in any manner.

FIG. 1 is a schematic diagram illustrating a computer network 100 in which embodiments of the present disclosure may be implemented. As shown in FIG. 1, the computer network 100 may include a plurality of nodes, such as nodes 110-170. Nodes in the computer network 100 may refer to a computer or other devices which may have an independent network address and be connected in a network having a functionality of transmitting or receiving data. In some embodiments, the nodes may be workstations, clients, network user devices or personal computers, as well as servers, printers or other network-connected devices. Every workstation, server, terminal device, or network device, that is, a device having its unique network address, may be a node of the computer network.

The nodes of computer network 100 are connected with each other via communication connections, and each node may have a node connected directly therewith. As an example, in FIG. 1, the node 110 is connected directly with nodes 120-160 through respective communicative connections 112-116, and the nodes 120-160 may be further connected directly with other nodes so as to form the computer network 100. On the other hand, as an example of non-direct connection (that is, indirect connection), the node 110 may be connected with a node 180 through the nodes 150 and 170.

It shall be understood that in some embodiments, the communication connections 112-116 may include devices for network connection, such as network cards, hubs, modems, repeaters, bridges, switches and routers, and various kinds of network connection lines, for example, cables, wireless links and so on. In addition, although FIG. 1 illustratively depicts a specific number of nodes and particular manner of connections, the computer network 100 may include any number of nodes and connections in any manner.

In some embodiments, the computer network 100 may be a decentralized network, that is, there is no master node, core nodes or management nodes for managing other nodes in the computer network 100. For example, the computer network 100 may be a network based on a multi-cloud system in which all nodes are based on end-to-end (p2p) connection and there is no master node to manage the cluster of nodes.

In such a decentralized network of a multi-cloud system, nodes may come from different cloud systems. For example, the nodes 120-140 directly connected with the node 110 may belong to a first cloud system while the nodes 150-160 may belong to a second cloud system. In comparison, the node 110 may belong to a third cloud system. In some embodiments, the first to third cloud systems are probably cloud systems that are owned by different companies. Moreover, the other properties of each node may also be different, for example, may come from different datacenters, and may have different configurations for each instance, such as whether having GPU or FGPA, and so on.

In various operations of the computer network 100, a common problem is how a node (such as the node 110) finds other nodes having specific properties in the computer network 100. In some cases, it is possible that the node 110 needs to find a (plurality of) node(s) that has (have) some specific properties to transmit data to this (these) node(s). For example, the node 110 needs to find a node that belongs to the same third cloud system, and the node is located in a specific datacenter and has a particular configuration (such as having a GPU).

Conventionally, without any knowledge on the topological structure of the computer network, the searching node implementing the searching needs to broadcast the search message to the entire network so that other nodes can learn that the searching node is searching a node with specific properties. However, since in a decentralized network, searching a node with specific properties is a common operation, the traditional broadcasting searching approach will consume a large amount of network resources. Moreover, as the propagation of broadcast message is relatively slow, it takes lots of time to find a desired node with the traditional broadcasting lookup approach.

More specifically, it is assumed that a decentralized data protection center is deployed on a multi-cloud system, a certain node is connected to a data protection system and it is desired to back up data to a particular cloud system (such as an amazon web service (AWS) cloud system). However, the other nodes connected directly with the node all operate on the other cloud systems different from the particular cloud system, and the data protection system does not have any master node to manage the cluster of nodes. Therefore, in order to find the node operating in the specific cloud system, the node must broadcast to the network. It is to be understood that, in the network, tens of thousands of nodes may have similar requests and face similar problems while the data protection system as the service provider cannot accommodate the network load caused by broadcasting to the network by each node.

In view of the above and other potential problems existing in the conventional broadcasting searching approach, embodiments of the present disclosure provide a method, an electronic device and a computer program product for searching for a node. The basic idea of the embodiments of the present disclosure is to realize searching of nodes based on a distributed hash table (DHT) so as to avoid broadcasting in the network, thereby saving network resources and searching time and thus, improving node searching in a computer network. The embodiments of the present disclosure will be described below in detail with reference to the drawings.

Figure 2A:
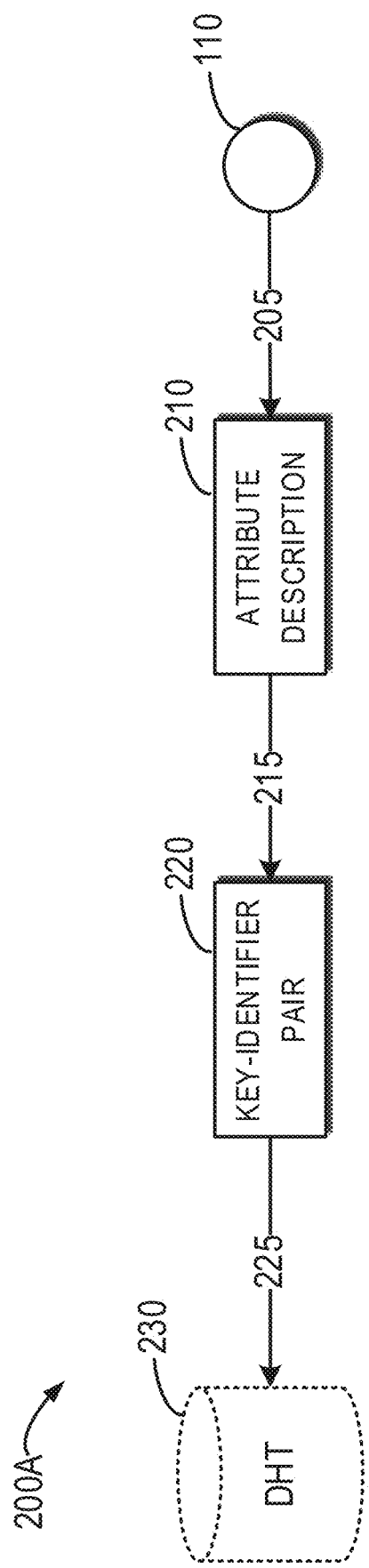
FIGS. 2A and 2B are schematic diagrams illustrating a node releasing process and a node searching process in accordance with embodiments of the present disclosure.
Figure 2B:
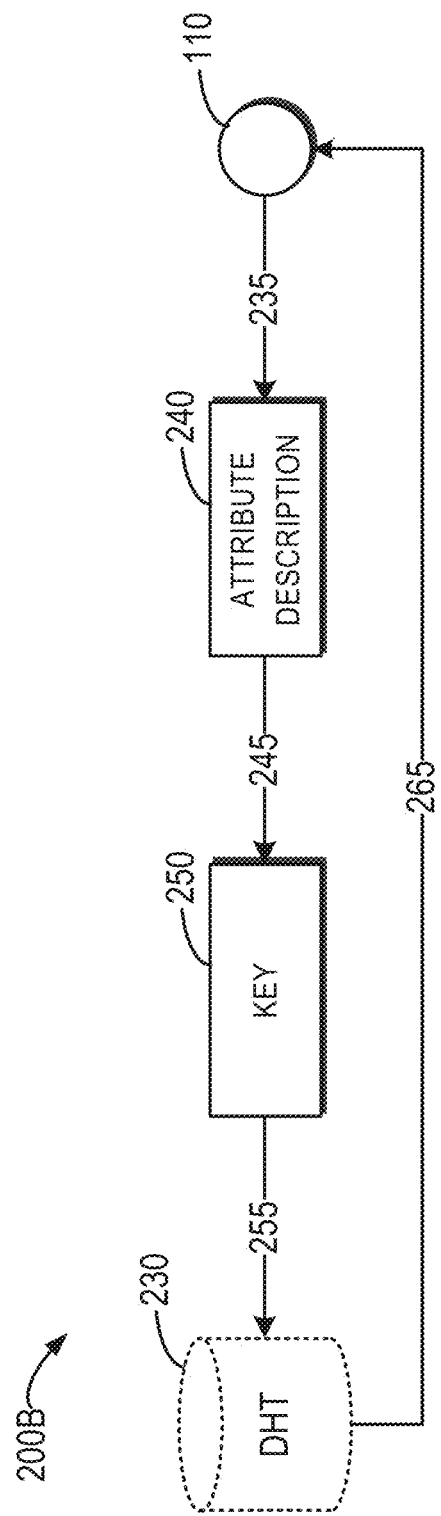

FIGS. 2A and 2B are schematic diagrams illustrating a node releasing process 200A and a node searching process 200B in accordance with the embodiments of the present disclosure. In the following, without loss of generality, the node 110 will be taken as an example to describe the embodiments of the present disclosure. It shall be understood that various operations and features described with respect to the node 110 are equally applicable to the other nodes in the computer network 100.

FIG. 2A is a schematic diagram illustrating a node releasing process 200A. As shown in FIG. 2A, in order to enable the other nodes in the computer network 100 to find the node 110 through properties of the node 110, the node 110 may determine 205 an attribute description 210 of the node 110 where the attribute description 210 includes multiple attribute items and respective attribute values. For example, the attribute items may be node type of the node 110, a cloud system to which it belongs, a data center in which it resides, whether it has a GPU, whether it has a FPGA, and the like. The respective attribute values of these attribute items may be "a cloud node," "an AWS cloud system," "east of the United States," "yes," "no" and so on.

To enable the node 110 to be found through more attribute items, the attribute description 210 should be as comprehensive as possible, that is, including the attribute items and the respective attribute values as much as possible, rather than simply marking one attribute value of a certain attribute item of node 110. Constantly changing properties (such as remaining storage capacity) is not suitable to be selected as the attribute item herein because the node implementing searching cannot predict attribute values of changing properties of the node to be searched and thus, cannot implement searching according to these changing properties.

After the attribute description 210 is determined, the node 110 may generate 215 a key-identifier pair 220 of the node 110 in the distributed hash table 230, where the key of the node 110 is obtained from its attribute description 210 based on a predetermined mapping while the identifier of the node 110 can identify the node 110 uniquely so that other nodes in the computer network 100 can also find the node 110 by the distributed hash table 230 according to the attribute description 210 of the node 110. In some embodiments, the identifier of the node 110 may include an IP address of the node 110 so that the node 110 can be addressed directly through the identifier.

In some embodiments, the predetermined mapping herein may include a hash function used by the distributed hash table 230 so that a routing algorithm based on the distributed hash table 230 can be used to ensure that the node 110 is searchable by the attribute distribution 210 in the network 100. In this aspect, it is worth mentioning that since the hash function as a predetermined mapping itself is second pre-image resistant, that is, if an input m1 is given, it is difficult to find a different input m2 to make hash(m1)=hash(m2); therefore, keys generated by different nodes with the same attribute description will be the same.

As described herein, the distributed hash table 230 is a decentralized distributed data organizing manager which provides a searching service similar to a hash table. A key-value pair is stored in the distributed hash table 230, and any node in the computer network 100 may retrieve the value associated with a given key efficiently by the distributed hash table 230. The distributed hash table 230 is stored in each node in a distributed manner, that is, the responsibility for maintaining a mapping from a key to a value is borne by each node in a distributed manner. In this way, a change of nodes in the computer network 100 will cause minimal amount of disruption to the distributed hash table 230. This allows the distributed hash table 230 to be scaled to an enormous amount of nodes and to flexibly handle node joining, leaving and failing.

The advantages of using the distributed hash table 230 in the computer network 100 are as follows. First, nodes collectively form the network 100 based on the distributed hash table 230 without any node for central coordination. Therefore, the network system based on the distributed hash table 230 is automatic and decentralized. Second, the network 100 based on the distributed hash table 230 is fault-tolerant. The entire network 100 is reliable even if nodes continuously join, leave and fail. Third, the network 100 based on the distributed hash table 230 has sound scalability and it can operate efficiently even with millions of, or tens of millions of, nodes.

In addition, during the process in which the node 110 generates 215 a key-identifier pair 220, even if the attribute item and the corresponding attribute value in use are the same, if the order and format of the attribute items are different, the "key-identifier" pair 220 generated through the same predetermined mapping may be different. Therefore, to ensure that the node implementing searching can find the node 110 effectively with the attribute description 210, the node 110 may record a plurality of attribute items and respective attribute values in the attribute description 210 based on an order and format designated by a predetermined protocol. All the nodes in the computer network 100 may abide by this predetermined protocol.

In some embodiments, the network 100 based on the distributed hash table 230 may include a Kademlia (KAD) network which can guarantee that the node to be searched for is found with O(log n) complicity, where n is the number of nodes in the system.

After the key-identifier pair 220 is generated, the node 110 will release 225 the key-identifier pair 220 to the distributed hash table 230. As mentioned above, the distributed hash table 230 is actually stored in each node in a distributed manner and there is no node that completely stores the entire distributed hash table 230. Therefore, the distributed hash table 230 is depicted with dashed lines in FIGS. 2A and 2B.

When the release 225 is implemented, the node 110 actually transmits the key-identifier pair 220 to at least one node 120-160 connected directly with node 110, and the node receiving the key-identifier pair 220 may store the key-identifier pair 220 so as to provide the identifier of the node 110 to the searching node when other nodes search for the node 110.

For example, the node 110 may transmit its key-identifier pair 220 to all the nodes 120-160 connected directly therewith. Alternatively, the node 110 may also transmit the key-identifier pair 220 to any number of nodes among nodes 120-160 based on predetermined rules. As an example, the node 110 may determine one or more nodes with the shortest logical distance to the node 110, such as the nodes 120-150, and then the node 110 may transmit the key-identifier pair 220 to the nodes 120-150. Here, the logical distance between nodes, for instance, may be determined based on an XOR operation between node identifiers.

In this manner, when the node 110 has a considerable number of (for example, hundreds of) nodes connected directly therewith, it may transmit its key-identifier pair 220 to only a smaller number of nodes, thereby allowing the network 100 to use a minimum amount of network resources to meet the predetermined reliability.

Now, turning to FIG. 2B, FIG. 2B depicts a schematic diagram of a node searching process 200B in accordance with the embodiments of the present disclosure. As shown in FIG. 2B, in order to find a node with specific properties, the node 110 may determine 235 the attribute description 240 of the node to be searched for. According to the attribute description 240, the node 110 generates 245 a search message which includes a key 250 of the node to be searched for and the identifier of the node 110 as the node to be searched for, the key 250 of the node to be searched for being obtained from the attribute description 240 with the same predetermined mapping used in the node releasing process 220A.

Through the search message, the key 250 may be used for searching for 255 the distributed hash table 230. To this end, since the distributed hash table 230 is distributed, the node 110 actually transmits the search message to at least one node 120-160 connected directly with the node 110 to finally reach the following node which stores the key-identifier pair including the key 250 of the node to be searched for.

Based on the key 250, the distributed hash table 230 may determine the identifier of the node to be searched for by the node 110, and then it may transmit 265 the identifier to the node 110. In an actual operation, the node 110 may receive the identifier of the node to be searched for from the node storing the key 250.

In some embodiments, the node 110 is not a node performing the searching but an intermediate node that receives search message from other nodes. In this case, the node 110 may receive a search message from the node connected directly therewith (such as node 150), the search message including a key of the node to be searched for (such as node 140 or node 190) and an identifier of the searching node (such as node 180). The node 110 may determine if it stores the key-identifier pair including the key of the node 140 or 190 to be searched for.

If the node 110 determines that it stores the key-identifier pair including the key of the node 140 to be searched for, then the node 110 may transmit the identifier of the node 140 to be searched for to the searching node 180. In some embodiments, to perform the transmission, a direct connection may be set up between the node 110 and the node 180.

On the other hand, if the node 110 determines that it does not store the key-identifier pair including the key of the node 190 to be searched for, then the node 110 may transmit the search message to at least one node connected directly therewith, such as the node 130, so that a query message finally reaches a node storing the key-identifier pair of the node 190.

In some scenarios, the node 110 possibly needs to search for a node with only some attribute items that are required to be of a specific attribute value. This scenario might be to search for all the nodes that belong to a specific cloud system without any requirement to other attribute items. Under this condition, the node 110 may perform multiple queries and then combine the results of the multiple queries. For example, when the attribute items include the node type, the cloud system to which it belongs, the data center in which it resides, and whether it has a GPU, the node 110 may set the attribute values of the cloud system as a specific cloud system and then set other attribute items sequentially as any possible attribute values to determine a plurality of attribute descriptions, so as to generate multiple query messages to perform the query.

As mentioned above, in a decentralized network 100, the node 110 may readily join or leave the network 100. However, when the node 110 leaves the network 100, it is difficult to remove an entry associated with the node 110 in the distributed hash table 230. Therefore, if the node 110 determines to leave the computer network 100, the node 110 may transmit a key-null pair to at least one node 120-160 connected directly with the node 110 so that other nodes in the network 100 cannot find the node 110 anymore with the key of the node 110.

In addition, in the network 100 based on the distributed hash table 230, the node 110 may become unavailable because of failure. To ensure that records of the distributed hash table 230 are accurate and valid, in response to expiration of a predefined time period (such as 24 hours), the node 110 may transmit the key-identifier pair 220 again to the at least one node 120-160 connected directly with the node 110. It is to be understood that the above specific length of the predefined time period is only an example, and in other embodiments, the computer network 100 may configure the predefined time period to be longer or shorter based on design requirement and/or network load.

Figure 3:
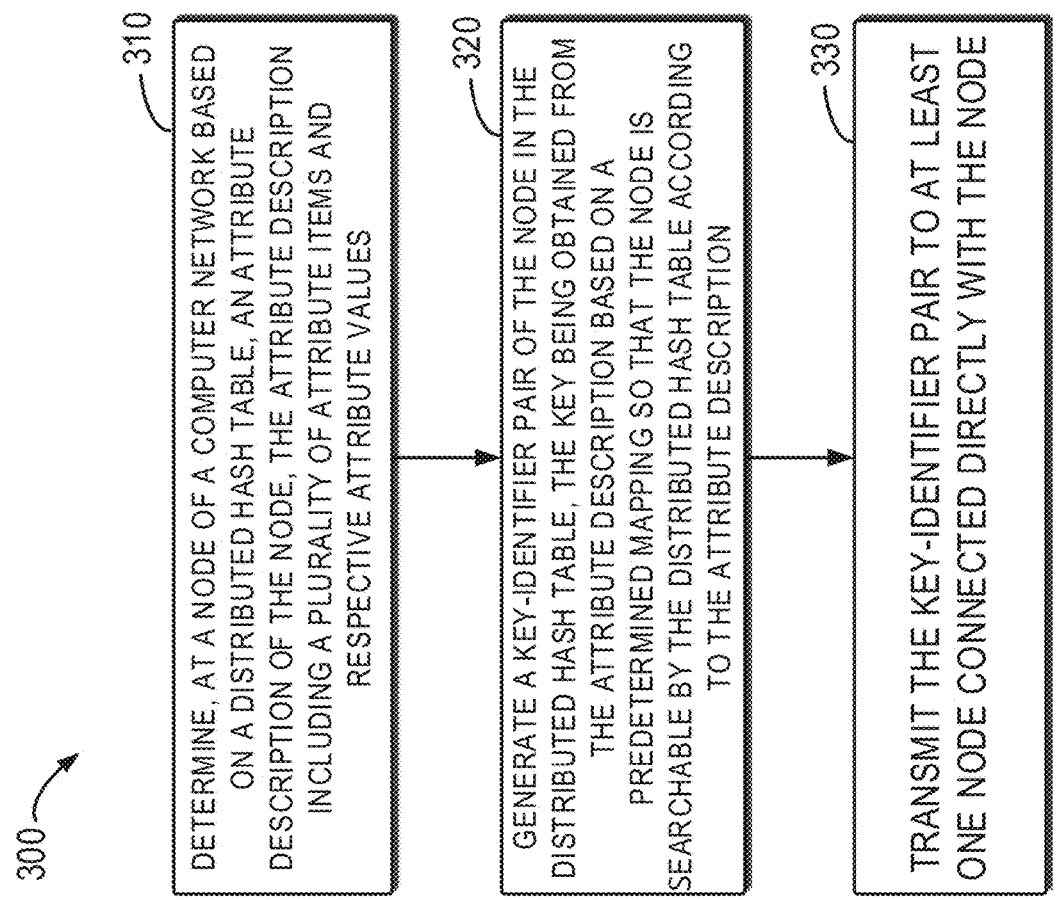
FIG. 3 is a flowchart illustrating a computer-implemented method in accordance with embodiments of the present disclosure.

FIG. 3 is a flowchart illustrating a computer-implemented method 300 in accordance with embodiments of the present disclosure. In some embodiments, the method 300 may be implemented by the node in the computer network 100 (such as the node 110), for example, by the processor or processing unit of the node 110 or various functional modules of the node 110. For ease of discussion, the method 300 will be depicted with reference to FIGS. 1 and 2A-2B.

At 310, at the node 110 of the computer network 100 based on the distributed hash table 230, the attribute description 210 of the node 110 is determined, including a plurality of attribute items and respective attribute values. At 320, the key-identifier pair 220 of the node 110 in the distributed hash table 230 is generated. The key is obtained from the attribute description 210 based on a predetermined mapping so that the node 110 is searchable by the distributed hash table 230 according to the attribute description 210. At 330, the node 110 transmits the key-identifier pair 220 to at least one node 120-160 connected directly with the node 110.

In some embodiments, the node 110 determines the attribute description 240 of the node to be searched for. The node 110 generates a search message which includes the key 250 of the node to be searched for and the identifier of the node 110, the key 250 of the node to be searched for being obtained from its attribute description 240 based on the predefined mapping. The node 110 transmits the search message to at least one node 120-160 connected directly with the node 110 so as to reach another node that stores the key-identifier pair including the key 250 of the node to be searched for. The node 110 receives the identifier of the node to be searched for from another node.

In some embodiments, the node 110 receives a search message from the node 150 which is connected directly with the node 110. The search message includes a key of the node 140 or 190 to be searched for and an identifier of the searching node 180. The node 110 determines if the node 110 stores the key-identifier pair including the key of the node 140 or 190 to be searched for.

In response to determining that the node 110 stores the key-identifier pair including the key of the node 140 to be searched for, the node 110 transmits the identifier of the node 140 to be searched for to the searching node 180. In response to determining that the node 110 does not store the key-identifier pair including the key of the node 190 to be searched for, the search message is transmitted to at least one node 130 connected directly with the node 110.

In some embodiments, in response to the node 110 leaving the computer network 100, the node 110 transmits the "key-null" pair 220 to at least one node 120-160 connected directly with the node 110. In some embodiments, in response to an expiration of a predefined time period, the node 110 transmits the key-identifier pair again to the at least one node 120-160 connected directly with node 110.

In some embodiments, the node 110 records a plurality of attribute items and respective attribute values in the attribute description 210 based on the order and format designated by the predetermined protocol. In some embodiments, the node 110 determines one or more nodes 120-150 with the shortest logical distance to the node 110, and transmits the key-identifier pair 220 to the one or more nodes 120-150. In some embodiments, the predetermined mapping includes a hash function used by the distributed hash table, and the identifier includes an IP address of the node.

In addition to the scenario described above, the embodiments of the present disclosure may also be used for quickly forming a subnet. With the embodiments of the present disclosure, a node newly joining the network may find a peer node announcing to have specific resources so that the node can be connected directly with it, thereby forming a subnet and making resource sharing easier.

Embodiments of the present disclosure may also be used for data protection load balance for multiple server nodes on a cloud. In this scenario, a node newly joining the grid of data protection servers will register itself, including cloud platform, storage capacity, region, I/O throughput, and dynamically update the status. When any backup policy or activity is run to find out nearby available capacity from the cloud, the orchestration layer of the cloud platform will traverse or query all the nodes to calculate a plurality of nodes with best cost balance or best performance. Therefore, the node can be connected directly with these nodes, thereby forming a subnet and making resource sharing easier.

Embodiments of the present disclosure may also be used for data protection auto-upgrade on the cloud. Specifically, when auto-upgrade for thousands of nodes running on the cloud platform is triggered, the orchestration layer of the cloud platform will calculate the priority of server nodes with different versions based on location attribute and cloud region attribute of the nodes to determine the best approach.

Figure 4:
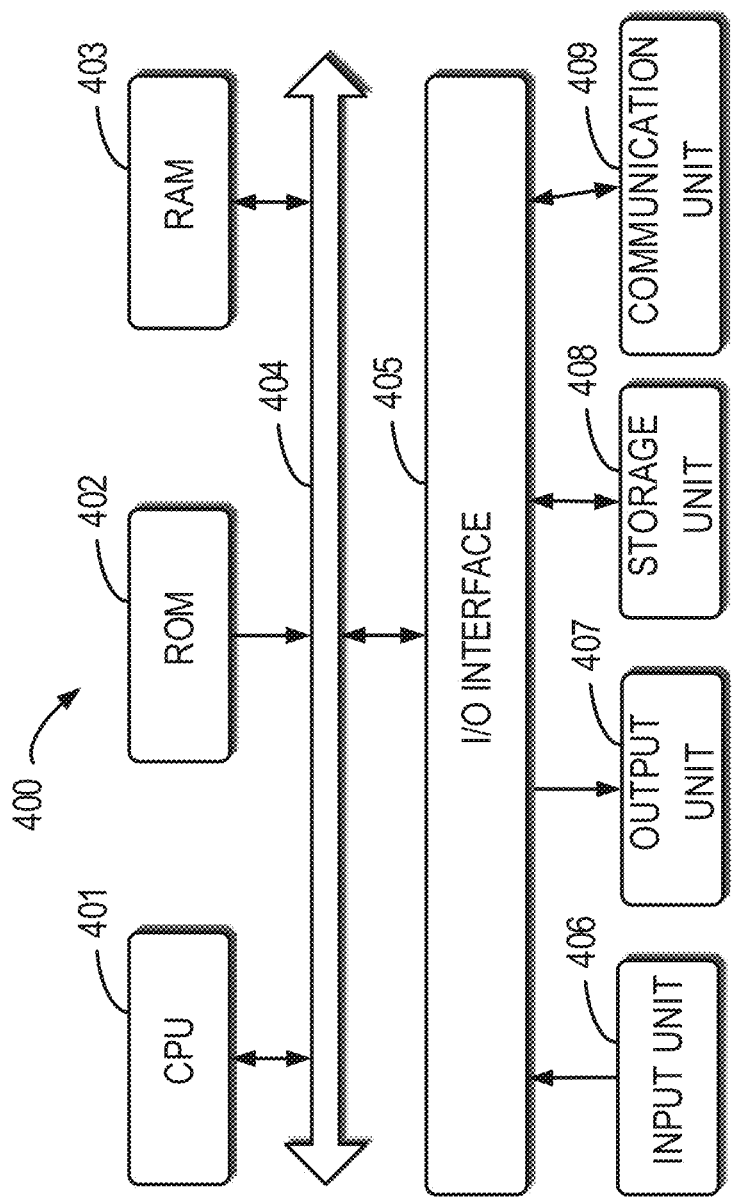
FIG. 4 is a schematic block diagram illustrating a device that may be used to implement embodiments of the present disclosure.

FIG. 4 schematically illustrates a block diagram of a device 400 that may be used to implement embodiments of the present disclosure. As illustrated in the FIG. 4, the device 400 comprises a central processing unit (CPU) 401 which can execute various appropriate actions and processing based on computer program instructions stored in a read-only memory (ROM) 402 or the computer program instructions loaded into a random access memory (RAM) 403 from a storage unit 408. The RAM 403 also stores all kinds of programs and data required by operating the storage device 400. The CPU 401, ROM 402 and RAM 403 are connected to each other via a bus 404 to which an input/output (I/O) interface 405 is also connected.

A plurality of components in the device 400 are connected to the I/O interface 405, comprising: an input unit 406, such as a keyboard, a mouse and the like; an output unit 407, such as various types of displays, loudspeakers and the like; a storage unit 408, such as a magnetic disk, an optical disk and the like; and a communication unit 409, such as a network card, a modem, a wireless communication transceiver and the like. The communication unit 409 allows the device 400 to exchange information/data with other devices through computer networks such as Internet and/or various telecommunication networks.

Each procedure and processing as described above, such as the method 300, can be executed by the processing unit 401. For example, in some embodiments, the method 300 can be implemented as computer software programs, which are tangibly included in a machine-readable medium, such as the storage unit 408. In some embodiments, the computer program can be partially or completely loaded and/or installed to the device 400 via the ROM 402 and/or the communication unit 409. When the computer program is loaded to the RAM 403 and executed by the CPU 401, one or more steps of the above described method 300 are implemented.

As used herein, the term "includes" and its variants are to be read as open-ended terms that mean "includes, but is not limited to." The term "based on" is to be read as "based at least in part on." The term "one embodiment" or "the embodiment" is to be read as "at least one embodiment." Terms "first," "second" and others can denote different or identical objects. The following text may also contain other explicit or implicit definitions.

As used in the text, the term "determine" covers various actions. For example, "determine" may include operating, calculating, processing, deriving, examining, looking up (such as look up in a table, a database or another data structure), finding out and so on. Furthermore, "determine" may include receiving (such as receiving information), accessing (such as accessing data in the memory) and so on. Meanwhile, "determine" may include analyzing, choosing, selecting, establishing and the like.

It should be noted that the embodiments of the present disclosure can be realized by hardware, software or a combination of hardware and software, where the hardware part can be implemented by a special logic; the software part can be stored in a memory and executed by a suitable instruction execution system such as a microprocessor or a special-purpose hardware. One having ordinary skill in the art may understand that the above system and method may be implemented with computer executable instructions and/or in processor-controlled code which is provided on a carrier medium such as a programmable memory or a data bearer such as an optical or electronic signal bearer.

Furthermore, although operations of the present methods are described in a particular order in the drawings, it does not require or imply that these operations are necessarily performed according to this particular sequence, or a desired outcome can only be achieved by performing all shown operations. On the contrary, the execution order for the steps as depicted in the flowcharts may vary. Alternatively, or in addition, some steps may be omitted, a plurality of steps may be merged into one step, and/or a step may be divided into a plurality of steps for execution. It will be noted that the features and functions of two or more units described above may be embodied in one unit. In turn, the features and functions of one unit described above may be further embodied in more units.

Although the present disclosure has been described with reference to various embodiments, it should be understood that the present disclosure is not limited to the disclosed embodiments. The present disclosure is intended to cover various modifications and equivalent arrangements included in the spirit and scope of the appended claims.

What is claimed is:

1. A computer-implemented method, comprising:
   in a multi-cloud environment, determining, at a first node of a computer network based on a distributed hash table, an attribute description of the first node, the attribute description comprising a plurality of attribute items and respective attribute values;
   generating a key-identifier pair of the first node in the distributed hash table, the key being obtained from the attribute description based on a predetermined mapping so that the first node is searchable by the distributed hash table according to the attribute description, the attribute description comprising information that identifies, from a plurality of cloud systems of the multi-cloud environment, a particular one of the plurality of cloud systems to which the first node belongs;
   transmitting the key-identifier pair to at least one node connected directly with the first node;
   receiving a search message from a second node connected directly with the first node, the search message comprising a key of a node to be searched for and an identifier of a searching node;
   determining whether the first node stores a key-identifier pair comprising the key of the node to be searched for; and
   in response to determining that the first node stores the key-identifier pair comprising the key of the node to be searched for, transmitting the identifier of the node to be searched for to the searching node.

2. The method of claim 1, further comprising:
   in response to determining that the first node fails to store the key-identifier pair comprising the key of the node to be searched for, transmitting the search message to at least one node connected directly with the first node.

3. The method of claim 1, further comprising:
   in response to the first node leaving the computer network, transmitting a "key-null" pair to at least one node connected directly with the first node.

4. The method of claim 1, further comprising:
   in response to expiration of a predetermined period, retransmitting the key-identifier pair to at least one node connected directly with the first node.

5. The method of claim 1, wherein determining the attribute description of the first node comprises:
   recording, in an order and a format specified by a predetermined protocol, the plurality of attribute items and respective attribute values in the attribute description.

6. The method of claim 1, wherein transmitting the key-identifier pair to at least one node connected directly with the first node comprises:
   determining one or more nodes with a shortest logical distance to the first node; and
   transmitting the key-identifier pair to the one or more nodes.

7. The method of claim 1, wherein the predetermined mapping comprises a hash function used by the distributed hash table.

8. The method of claim 1, wherein the identifier comprises an IP address of the first node.

9. An electronic device, comprising:
   at least one processor; and
   at least one memory including computer program instructions, the at least one memory and the computer program instructions being configured to, together with the at least one processor, cause the electronic device to:
      in a multi-cloud environment, determine, at a first node of a computer network based on a distributed hash table, an attribute description of the first node, the attribute description comprising a plurality of attribute items and respective attribute values;
      generate a key-identifier pair of the first node in the distributed hash table, the key being obtained from the attribute description based on a predetermined mapping so that the first node is searchable by the distributed hash table according to the attribute description, the attribute description comprising information that identifies, from a plurality of cloud systems of the multi-cloud environment, a particular one of the plurality of cloud systems to which the first node belongs;
      transmit the key-identifier pair to at least one node connected directly with the first node;
      receive a search message from a second node connected directly with the first node, the search message comprising a key of a node to be searched for and an identifier of a searching node;
      determine whether the first node stores a key-identifier pair comprising the key of the node to be searched for; and
      in response to determining that the first node stores the key-identifier pair comprising the key of the node to be searched for, transmit the identifier of the node to be searched for to the searching node.

10. The electronic device according to claim 9, wherein the at least one memory and the computer program instructions are further configured to, together with the at least one processor, cause the electronic device to:
   in response to determining that the first node fails to store the key-identifier pair comprising the key of the node to be searched for, transmit the search message to at least one node connected directly with the first node.

11. The electronic device according to claim 9, wherein the at least one memory and the computer program instructions are further configured to, together with the at least one processor, cause the electronic device to:
   in response to the first node leaving the computer network, transmit a "key-null" pair to at least one node connected directly with the first node.

12. The electronic device according to claim 9, wherein the at least one memory and the computer program instructions are further configured to, together with the at least one processor, cause the electronic device to:
   in response to expiration of a predetermined period, retransmit the key-identifier pair to at least one node connected directly with the first node.

13. The electronic device according to claim 9, wherein the at least one memory and the computer program instructions are further configured to, together with the at least one processor, cause the electronic device to:
   record, in an order and a format specified by a predetermined protocol, the plurality of attribute items and respective attribute values in the attribute description.

14. The electronic device according to claim 9, wherein the at least one memory and the computer program instructions are further configured to, together with the at least one processor, cause the electronic device to:
   determine one or more nodes with a shortest logical distance to the first node; and
   transmit the key-identifier pair to the one or more nodes.

15. The electronic device according to claim 9, wherein the predetermined mapping comprises a hash function used by the distributed hash table and, wherein the identifier comprises an IP address of the first node.

16. A computer program product tangibly stored on a non-transitory computer readable medium and including machine executable instructions which, when executed, cause the machine to perform steps of:
   in a multi-cloud environment, determining, at a first node of a computer network based on a distributed hash table, an attribute description of the first node, the attribute description comprising a plurality of attribute items and respective attribute values;
   generating a key-identifier pair of the first node in the distributed hash table, the key being obtained from the attribute description based on a predetermined mapping so that the first node is searchable by the distributed hash table according to the attribute description, the attribute description comprising information that identifies, from a plurality of cloud systems of the multi-cloud environment, a particular one of the plurality of cloud systems to which the first node belongs;
   transmitting the key-identifier pair to at least one node connected directly with the first node;
   receiving a search message from a second node connected directly with the first node, the search message comprising a key of a node to be searched for and an identifier of a searching node;
   determining whether the first node stores a key-identifier pair comprising the key of the node to be searched for; and
   in response to determining that the first node stores the key-identifier pair comprising the key of the node to be searched for, transmitting the identifier of the node to be searched for to the searching node.

17. The computer program product of claim 16, wherein the machine executable instructions which, when executed, cause the machine to further perform the step of:
   in response to determining that the first node fails to store the key-identifier pair comprising the key of the node to be searched for, transmit the search message to at least one node connected directly with the first node.

18. The computer program product according to claim 16, wherein the machine executable instructions which, when executed, cause the machine to further perform the step of:
   in response to the first node leaving the computer network, transmit a "key-null" pair to at least one node connected directly with the first node.

19. The computer program product according to claim 16, wherein the machine executable instructions which, when executed, cause the machine to further perform the step of:
   in response to expiration of a predetermined period, retransmit the key-identifier pair to at least one node connected directly with the first node.

20. The computer program product according to claim 16, wherein the machine executable instructions which, when executed, cause the machine to further perform the step of:
   record, in an order and a format specified by a predetermined protocol, the plurality of attribute items and respective attribute values in the attribute description.

\* \* \* \* \*